United States Patent [19]
Phillips et al.

[11] Patent Number: 4,624,610
[45] Date of Patent: Nov. 25, 1986

[54] MILLING MACHINE

[75] Inventors: James D. Phillips, Posen; Robert L. Sheets, Madison Heights, both of Mich.

[73] Assignee: J. D. Phillips Corporation, Alpena, Mich.

[21] Appl. No.: 771,827

[22] Filed: Sep. 3, 1985

Related U.S. Application Data

[62] Division of Ser. No. 508,084, Jun. 27, 1983, Pat. No. 4,551,048.

[51] Int. Cl.⁴ .............................................. B23C 3/06
[52] U.S. Cl. ................................... 409/132; 51/101 R; 51/281 C; 409/199
[58] Field of Search .......... 409/76, 77, 80, 84, 409/131, 132, 165, 186, 187, 188, 191, 193, 194, 195, 196, 199, 200, 201, 204, 209, 210, 211, 215, 226, 228, 230, 234; 51/101 R, 105 EC, 105 SP, 129, 131.1, 281 R, 281 C

[56] References Cited

U.S. PATENT DOCUMENTS

| | | | |
|---|---|---|---|
| 2,200,544 | 5/1940 | Drummond | 409/132 |
| 2,225,400 | 12/1940 | Kraus | 409/228 |
| 2,275,443 | 3/1942 | Kraus | 409/228 |
| 2,654,189 | 10/1953 | Dunn et al. | 51/105 SP X |
| 3,221,607 | 12/1965 | Larsson | 409/76 |
| 4,177,699 | 12/1979 | Dovnar et al. | 409/132 X |
| 4,205,488 | 6/1980 | Englander et al. | 51/105 SP |

FOREIGN PATENT DOCUMENTS

| | | | |
|---|---|---|---|
| 605674 | 3/1926 | France | 409/200 |
| 37281 | 3/1977 | Japan | 409/199 |
| 530672 | 12/1940 | United Kingdom | 409/132 |
| 652591 | 4/1951 | United Kingdom | 409/199 |
| 1140841 | 1/1969 | United Kingdom | 409/204 |

*Primary Examiner*—Gil Weidenfeld
*Assistant Examiner*—Glenn L. Webb
*Attorney, Agent, or Firm*—Barnes, Kisselle, Raisch, Choate, Whittemore & Hulbert

[57] ABSTRACT

A method for milling a radial projection on an elongated workpiece such as a camshaft. A milling head is provided with a plurality of cutting elements mounted in a circular arrangement on a conical face portion thereof. The head is supported with its axis of rotation so oriented with respect to the workpiece that when rotated the cutting elements move in a path the plane of which forms an angle of less the 90° with the longitudinal axis of the workpiece.

9 Claims, 11 Drawing Figures

FIG. 10
FIG. 9
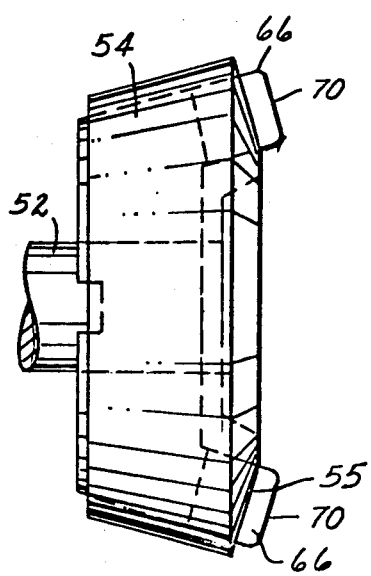
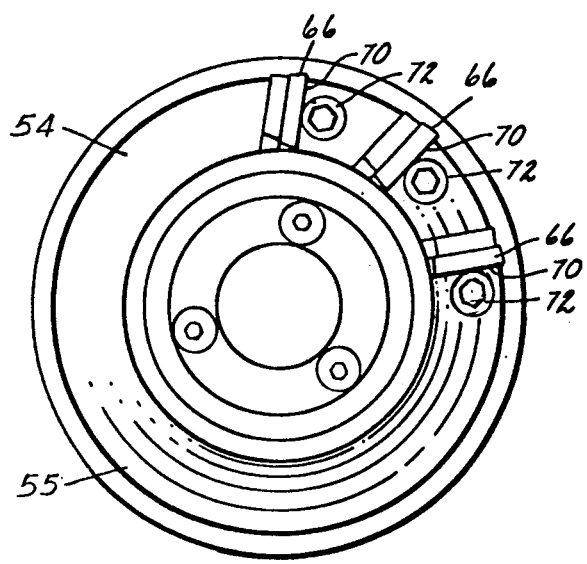
FIG. 11
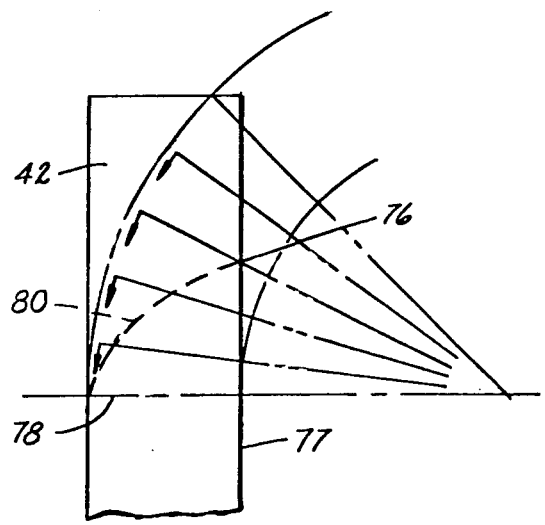

4,624,610

MILLING MACHINE

REFERENCE TO RELATED APPLICATION

This is a division of our co-pending application Ser. No. 508,084 U.S. Pat. No. 4,551,048 filed June 27, 1983.

This invention relates generally to milling machines and refers more particularly to a method and machine for milling a cam profile on a camshaft.

BACKGROUND AND SUMMARY OF THE INVENTION

Experience has shown that a camshaft, being not very rigid, reacts violently to the severe forces imposed by conventional milling cutters now in use to mill cam profiles. Such milling cutters have cutting inserts mounted on the cylindrical periphery of a head which turns on an axis parallel to the camshaft. The cutting inserts move in a circular path at right angles to the axis of rotation of the camshaft, and the full force of each cutting insert is exerted in a direction perpendicular to the camshaft.

In accordance with the present invention, the cutting inserts move in a path forming an angle of less than 90° to the axis of rotation of the camshaft, so that during most of the cut a substantial component of the cutting force is transmitted along the axis of the camshaft and absorbed by the headstock or tailstock of the lathe.

More specifically, the cutting inserts are mounted on a cone-shaped milling head the axis of rotation of which intersects the axis of rotation of the camshaft at an acute angle. The cutting inserts take a shaving cut, beginning at a point on one side edge of the cam and ending in a line across the full width of the cam. Because of the acute angle orientation of the milling head, the cutting inserts take a flatter, shallower cut and thus the maximum force of impact is less than is the case with conventional milling cutters.

Further in accordance with the invention, power means are provided for feeding the milling head toward and away from the camshaft in order to mill the desired cam profile, with signal means for determining the rotative position of the camshaft and for producing, processing and transmitting a signal based on that determination to operate the power means. Also a power drive is provided for variably rotating the camshaft so as to maintain a constant surface speed of the cam as it is milled to the desired contour, with signal means for determining the position of the milling head in relation to the camshaft and for producing, processing and transmitting a signal based on that determination to operate the power drive. The signal means for determining the rotative position of the camshaft and the position of the milling head in relation to the camshaft each includes a position transducer and a computer.

These and other objects of the invention will become more apparent as the following description proceeds especially when considered with the accompanying drawings.

BRIEF DESCRIPTION OF THE DRAWINGS

FIG. 9 is an enlarged front view of the milling head of this invention, with only some of the cutting inserts shown.

FIG. 10 is a side view of the milling head of FIG. 9.

FIG. 11 is a schematic view, somewhat exaggerated, showing the path of a cutting insert during the cutting of a chip from the cam periphery.

DETAILED DESCRIPTION

Figure 1:
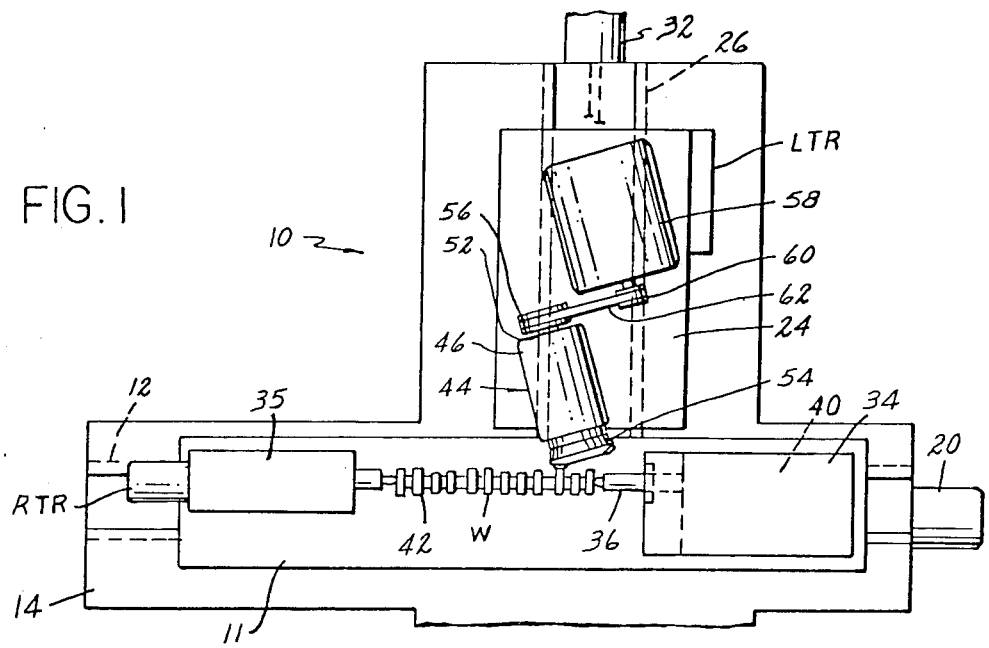
FIG. 1 is a top plan view of apparatus embodying the invention.
Figure 2:
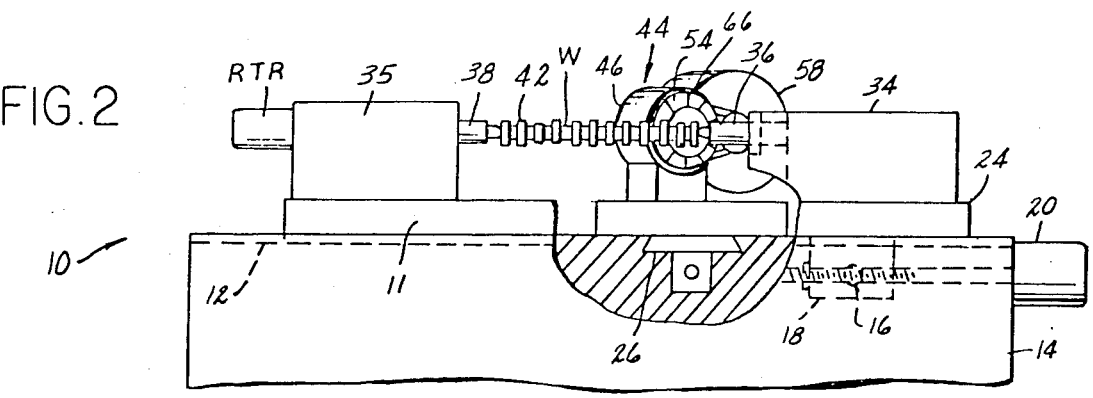
FIG. 2 is a front elevational view of the apparatus shown in FIG. 1, with parts broken away and in section.
Figure 3:
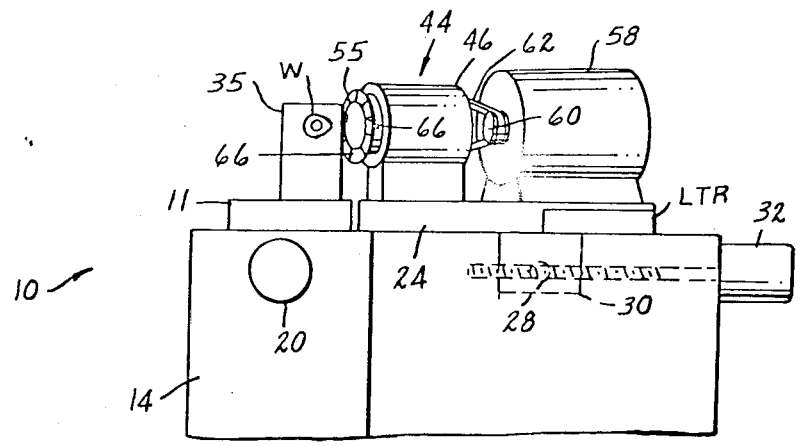
FIG. 3 is an end view of the apparatus shown in FIGS. 1 and 2, with the headstock removed.

Referring now more particularly to the drawings, the numeral 10 designates a milling machine comprising a work table 11 slidably mounted on ways 12 on a supporting base 14 and movable to an adjusted position along the ways by means of a ball screw drive 16 which engages a part 18 on the table and is powered by a reversible motor 20. The numeral 24 designates a milling cutter table slidably mounted on a lateral extension of the base on ways 26 which are at right angles to the ways 12. The milling cutter table 24 is movable toward and away from the work table by means of a ball screw drive 28 which engages a part 30 on the table 24 and is powered by a reversible motor 32.

A unit mounted on the work table 11 comprises a headstock 34 and tailstock 35 located adjacent opposite ends of the table and having aligned work supporting centers 36 and 38 spaced from one another in confronting relation. The centers cooperate to engage and support an elongated workpiece W as clearly shown in the drawings. The head center 36 is driven by a variable speed motor 40 located in the headstock. The tailstock center 38 is not driven and is capable of free rotation. The workpiece W in this instance is a camshaft having numerous radial projections 42 along its length. The radial projections 42 in the initial form of the camshaft may be circular, but are milled to non-circular configuration, that is, to the desired cam profile, by the milling cutter 44.

The milling cutter 44 is mounted on the milling cutter table 24 and comprises a housing 46. A shaft 52 journaled in the housing for rotation has a milling head 54 mounted on one end and a sheave 56 mounted on the other end. A motor 58 mounted on the table 24 has a sheave 60 on its output shaft, and a belt 62 from sheave 60 to sheave 56 transmits the motor drive to the milling head 54 to rotate the latter.

The milling head 54 has a front face 55 which is of truncated conical shape concentric with the axis of rotation 57 of the milling head, the axis of rotation being the longitudinal axis of shaft 52. A plurality of cutting inserts 66 are mounted on the conical face with their cutting edges 70 extending radially with respect to the axis of rotation. Only three such cutting inserts are shown in FIG. 9, but it will be understood that these cutting inserts are preferably equally conferentially spaced throughout a full 360° and although the number of such cutting inserts may vary, in the present instance ten are provided. The cutting inserts are removably mounted in slots formed in the conical surface by any suitable means, such for example, as threaded retainers 72.

Figure 4:
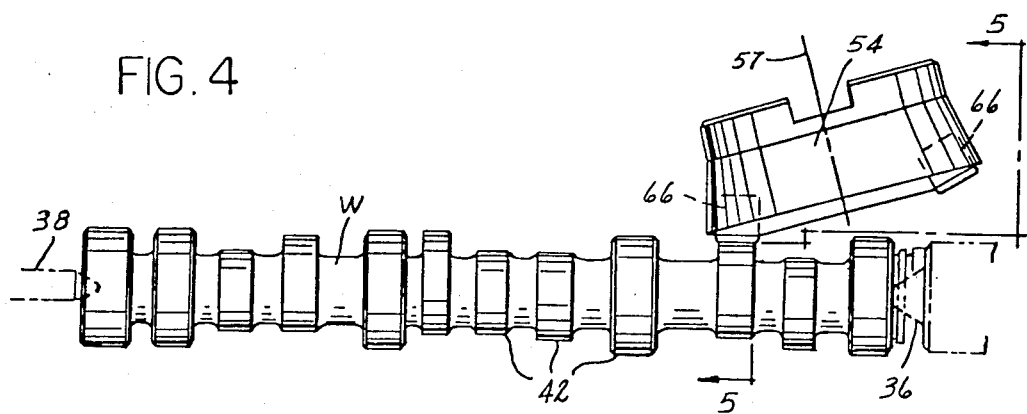
FIG. 4 is an enlarged fragmentary view of portions of the apparatus shown in FIG. 1.

The axis of rotation 57 of the milling head 54 intersects the longitudinal axis of the camshaft W at an acute angle. This angle may vary but as shown, must be large enough to clear adjacent cams on the camshaft as well as the headstock and tailstock (see FIG. 4). An angle of about 20° produces excellent results. The angle that the conical surface 55 of the milling head makes with a plane perpendicular to the axis of rotation of the milling head is the same as the angle that the milling head axis of rotation forms with the camshaft. Accordingly, during milling, the cutting edges 70, which are disposed at the same angle as the conical surface (see FIG. 10) cut the cam profile parallel to the longitudinal axis of the camshaft (see FIG. 4). Actually, the cutting inserts could, if desired, be inclined slightly so that their cutting edges 70 would be at a different angle than that shown in FIGS. 4 and 10 and cut the cam profile at an acute angle to the longitudinal axis of the camshaft.

Figure 5:
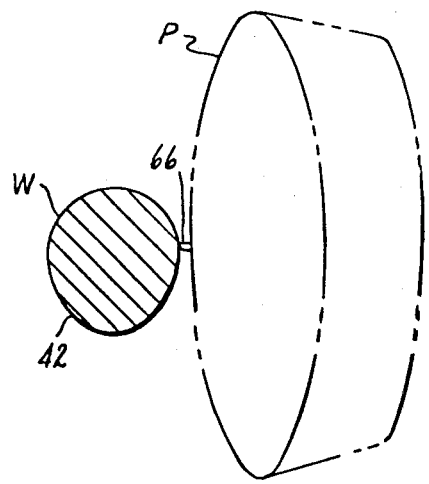
FIG. 5 is a diagrammatic view showing the path of a cutting insert on the milling head during the milling of the cam profile.
Figure 6:
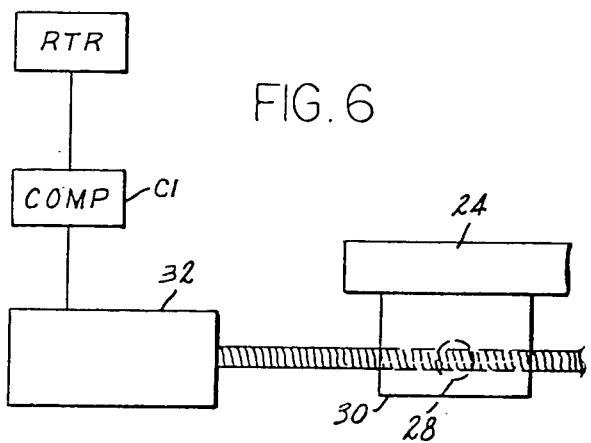
FIG. 6 is a diagrammatic view showing the power means for feeding the milling head and the signal means employed to operate the power means.

When the table 24 is advanced to move the milling head 54 into cutting position with respect to one of the cams on the camshaft, and with the camshaft rotating, the cutting inserts on the rotating milling head move in rapid sequence through the circular path P in FIG. 5, each cutting insert taking a chip from the periphery of the rotating cam. Because of the relationship of the milling head to the camshaft, each cutting insert takes a shaving or shearing cut from the periphery of the cam, beginning at a point 76 on one side edge 77 of the cam and ending in a line 78 extending across the full width of the cam, such line 78 extending parallel to the axis of rotation of the camshaft. In FIG. 11, which is greatly exaggerated, the dotted line 80 illustrates the sweep of a cut across the periphery of the cam from the starting point 76 to the end of the cut at line 78 to produce a generally triangular chip defined by the line 80, the side edge 77 of the cam and the line 78.

Figure 8:
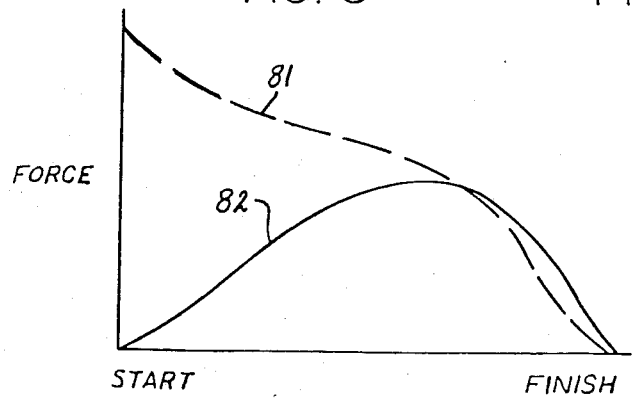
FIG. 8 is a diagram showing the forces applied to the camshaft from beginning to end of a cut, for conventional milling heads as well as for the milling head of this invention.
Figure 7:
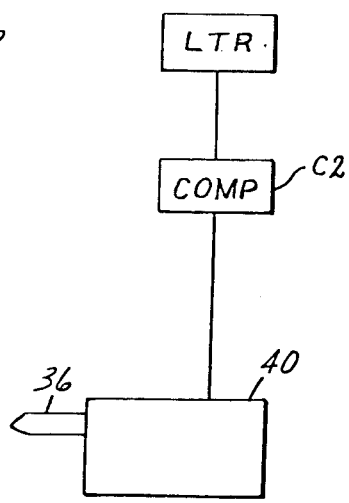
FIG. 7 is a diagrammatic view showing the power drive for variably rotating the camshaft and the signal means for operating it.

As stated above, with conventional milling cutters, the cutting inserts move in a circular path at right angles to the axis of rotation of the camshaft, so that the full force of each cutting insert is exerted perpendicular to the camshaft. Also the inserts take relatively deep cuts, increasing the maximum force involved. The cutting force is a maximum at the start of the cut and then decreases progressively to the finish of the cut, as indicated by the dotted line 81 in FIG. 8.

With the machine of this invention, on the other hand, the cutting action, including forces and direction of cut, is quite different. At initial contact of a cutting insert, the magnitude of force is relatively low because the cut starts at a point 76. At this time, a substantial component of the cutting force runs longitudinally of the camshaft (see arrows in FIG. 11) and is absorbed in the tailstock or headstock of the lathe, putting much less stress on the camshaft. As the cut progresses, both the cutting force and width of the cut increase, followed by a stabilizing of the cutting force as the width of cut continues to increase but the depth of cut decreases. Toward the end of the cut, the rate of increase in the width of cut slows while the chip thickness continues to decrease, resulting in a decline in the magnitude of the cutting force. This is shown by the line 82 in FIG. 8. Of course, as the cut progresses, the direction of the cutting force becomes more and more perpendicular to the camshaft, but since these forces diminish rapidly toward the end of the cut, the camshaft is able to withstand the impact. A flatter, shallower cut is achieved as a result of the angle of path P through which the cutting elements move which is less than 90° to the camshaft axis.

In order to form a cam profile on one of the radial projections 42, the camshaft is rotated by motor 40 while the motor 32 for the milling cutter table 24 is operated to move the milling head toward or away from the camshaft in accordance with the particular cam profile desired to be cut. Control of motor 32 could be effected mechanically, for example, by means of an annular pattern or template mounted on the headstock center and a tracer for following the contour of the pattern and transmitting a signal calling for the required operation of the motor, either to advance or retract the milling cutter table. However, such mechanical means would necessitate a separate pattern for each cam profile. Preferably control of the motor 32 is by means of a position transducer RTR and computer C1. The transducer RTR is a rotary transducer having a fixed element on the tailstock and a movable element connected to and adapted to turn with the tailstock center 38, which turns with the camshaft W, and thus track and determine the angular or rotative position of the camshaft. The transducer RTR feeds this information to the computer C1 which calculates the cam radius for that particular angular position for the camshaft W and sends a signal to the motor 32 to operate the ball screw drive 28 of the milling cutter table 24, to either advance or to retract the milling head relative to the camshaft.

If the camshaft is rotated at a constant angular speed, the surface speed of the cam being milled will vary depending upon the cam surface profile, which is undesirable. Therefore, in order to achieve a constant surface speed of the cam profile being milled, means are provided to vary the angular speed of the camshaft. Control of the motor 40 for rotating the camshaft W is by means of a position transducer LTR and computer C2. The transducer LTR is a linear transducer having a fixed element on the base 14 and a movable element connected to and adapted to move with the milling cutter table 24 and thus track and determine the position of the milling head 54 relative to the camshaft W. The transducer LTR feeds this information to the computer C2 from which a signal to the drive motor 40 for the headstock adjusts the speed of rotation of the headstock to obtain a uniform surface speed of the cam profile being milled.

In the operation of the milling machine, the motor 20 is operated to longitudinally adjust the position of the camshaft relative to the milling head, depending upon which particular radial projection on the camshaft is to be milled to an appropriate cam profile. The motor 40 for rotating the headstock and hence the camshaft turns the camshaft at a speed on the order of about one revolution in seven seconds. Motor 40 may turn the camshaft in either direction. The motor 58 for driving the milling head turns the milling head at a speed on the order of about 1,000 rpm. As the camshaft rotates, the milling head 54 is brought into operative relation with the periphery of the radial projection to be milled by means of the motor 32. As the milling head rotates, the cutting inserts 66 move rapidly through the circular path P in FIG. 5, each taking a chip from the periphery of the rotating radial projection on the camshaft with a shaving cutting action as previously described. The milling head is moved toward and away from the camshaft as the camshaft rotates, to mill the desired cam profile on the radial projection, such movement of the milling head being controlled by the rotary transducer RTR which tracks the angular position of the camshaft and the computer C1 which calculates the cam radius for that particular angle and sends an appropriate signal to the motor 32.

The changing radius of the projection on the camshaft being milled requires a slight continuing adjustment in the speed of rotation of the headstock by motor 40 in order to achieve a constant surface speed of the projection. This is accomplished by the linear transducer LTR which tracks the position of the milling cutter table 24 and feeds this information to the computer C1 which calculates the correct speed of rotation for the headstock and sends an appropriate signal to the motor 40.

The cam profile is milled to the desired contour in just one revolution of the camshaft.

We claim:

1. A method of milling an eccentric cam on a cam shaft, comprising:
   supporting and rotating the cam shaft about its longitudinal axis,
   providing a milling cutter comprising a rotatable milling head, said head having a front face adjacent to the cam shaft, and a plurality of cutting elements having cutter edges and mounted on an annular portion of said front face of said head in a circular array about the axis of rotation of said head,
   supporting said head with its front face in confronting relation to the cam shaft and with its axis of rotation at an acute angle to the longitudinal axis of the cam shaft such that when said head is rotated the path of said cutting edges lies in a plane which forms an acute angle with the longitudinal axis of the cam shaft and such that the cutting elements successively engage the cam on the cam shaft,
   feeding said milling head toward and away from the cam shaft in a path at right angles to the longitudinal axis of the cam shaft in accordance with the contour to be milled on the eccentric cam, and rotating said head,
   said cutting elements each taking a progressive cut beginning at a point on said side edge of said cam which has a substantial force vector component longitudinally of the cam shaft and ending in a line across the full width of the cam having a force vector substantially perpendicular to the cam shaft.

2. A Method as defined in claim 1, wherein said cutting elements are mounted on said annular portion of said front face of said head in a manner such that, when said head is rotated about its axis of rotation, said cutting edges move in a path which defines the surface of a frustum of a cone concentric with the axis of rotation of said head.

3. A method as defined in claim 2, including making a continuous determination of the rotative position of the cam shaft, and producing, processing and transmitting a signal based on said determination to control the feeding of the milling head.

4. A method as defined in claim 3, wherein said determination is made by signal means including a position transducer and a computer.

5. A method as defined in claim 2, including varying the rotative speed of the cam shaft so as to maintain a constant surface speed of the cam as it is milled to the desired contour.

6. A method as defined in claim 5, including making a continuous determination of the position of the milling head in relation to the cam shaft, and producing, processing and transmitting a signal based on said determination to control the rotative speed of said cam shaft.

7. A method as defined in claim 6, wherein said determination is made by signal means including a position transducer and a computer.

8. A method as defined in claim 5, including making a continuous determination of the rotative position of the cam shaft, producing, processing and transmitting a signal based on said determination of the rotative position of the cam shaft to control the feeding of the milling head, making a continuous determination of the position of the milling head in relation to the cam shaft, and producing, processing and transmitting a signal based on said determination of the position of the milling head to control the rotative speed of the cam shaft.

9. A method as defined in claim 8, wherein said first and second mentioned determinations are each made by signal means including a position transducer and a computer.

* * * * *